July 25, 1950

E. H. LAND ET AL 2,516,398

PHOTOGRAPHIC APPARATUS FOR EXPOSING
AND PROCESSING PHOTOGRAPHIC FILM

Filed Feb. 20, 1947

Edwin H. Land
Joseph J. Carbone
and
John A. Carrier
INVENTORS

BY
Donald L. Brown
Attorney

July 25, 1950  E. H. LAND ET AL  2,516,398
PHOTOGRAPHIC APPARATUS FOR EXPOSING
AND PROCESSING PHOTOGRAPHIC FILM
Filed Feb. 20, 1947  2 Sheets-Sheet 2

Edwin H. Land
Joseph J. Carbone
and
John A. Carrier
INVENTORS

BY Donald L. Brown
Attorney

Patented July 25, 1950

2,516,398

UNITED STATES PATENT OFFICE 2,516,398

PHOTOGRAPHIC APPARATUS FOR EXPOSING AND PROCESSING PHOTOGRAPHIC FILM

Edwin H. Land, Cambridge, Joseph F. Carbone, Everett, and John A. Carrier, Lexington, Mass., assignors to Polaroid Corporation, Cambridge, Mass., a corporation of Delaware Application February 20, 1947, Serial No. 729,858

19 Claims. (Cl. 95—13)

This invention relates to photography and more particularly to camera apparatus.

Apparatus of the present invention is suitable for incorporation with a camera and is adapted to accomplish processing of photographically exposed portions of film material through controlled compression of the film and other materials. When employed with film and other materials as described herein, the apparatus is capable of providing a positive print of the subject image of a photographic exposure. More particularly, the invention incorporates compressive controls enabling a consistently satisfactory quality of processed materials, means for preventing possible fouling of the apparatus by any of the materials employed in processing, and means for separating any excess of processing materials from image carrying portions of the materials.

An object of the invention is to provide mechanism for compressing given areas of the materials and for excluding other areas of the materials from subjection to compression.

Another object of the invention is to provide, in camera apparatus of the aforementioned type and adapted to compress an exposed film and another material in such manner as to cause a processing fluid interposed between the materials to flow therebetween, mechanism for relieving compression of predetermined areas of the materials whereby the fluid may flow into these areas but receive substantially no motivating force for flowing beyond said areas and thus may remain therewithin.

A further object of the invention is to provide, in apparatus of the aforesaid type, mechanism for excising those noncompressed areas of materials which contain an accumulation of fluid from other portions of the materials.

Other objects of the invention are to provide compression applying and compression relieving devices of the aforesaid type which operate in predetermined sequence, the provision of pressure applying and pressure relieving components each of which provides propulsion of sheet materials engaged thereby; the provision respectively of compressive and selectively noncompressive devices of the aforesaid type in the form of pressure rollers and associated rotatable pressure relieving mechanism; and provision of means for otherwise varying the compressive properties of pressure applying elements.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
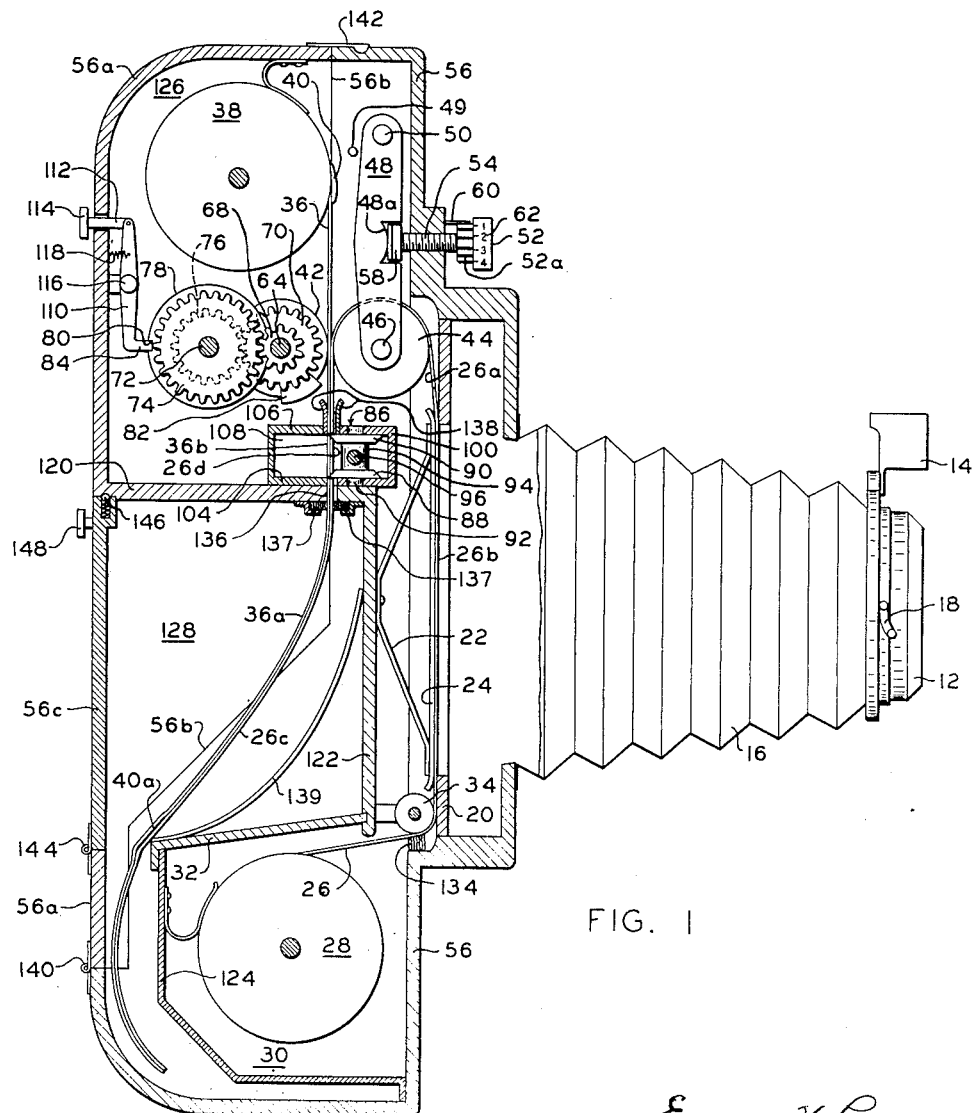
Figure 1 is a somewhat schematic side elevational view, partly in cross section and with parts broken away, of a camera comprising mechanism of the invention.

Apparatus of the invention is particularly adapted to incorporation with a camera of the general type shown in Fig. 1. In such a camera a plurality of operations may be performed upon a light-sensitive film material, said operations comprising photographic exposure of the film, advancement of the exposed surface of film to proximity with a preferably opaque sheet material, interposition of a predetermined quantity of processing fluid between the materials, and subjection of the film and other sheet material to compression for spreading the processing fluid between the materials, throughout areas thereof including and coextensive with the exposed area of film, said areas being hereinafter termed the "image areas." Said operations are particularly adapted to carry on a process whereby there is provided a positive print of the subject image of the photographic exposure within and/or upon one of the materials.

Referring to Fig. 1, a camera embodying apparatus of the invention, in association with other mechanism, for performing the aforementioned operations is shown in side elevation. Conventional elements for photographic exposure of a film comprise lens 12, view-finder 14, bellows 16, shutter release means 18, framing plate 20, and means comprising compression spring 22 and pressure plate 24 for holding the film 26 in the focal plane. Film 26 is preferably supplied from a spool 28 enclosed in a light-tight chamber 30, having removable cover plate 32, and is advanced to the focal plane over suitable guide means such as guide roller 34. The film may preferably comprise an opaque base or backing material.

A roll of sheet material 36 as, for example, a paper material is supplied from suitable means such as spool 38. The paper is appropriately opaque, of substantially similar dimensions to the film, and preferably comprises a surface suitable for formation of a positive photographic print thereupon, said surface being that which is brought to facing relation with the exposed surface of film, and jointly compressed and subjected to the processing fluid therewith. In the camera means illustrated, the fluid for processing each exposed area of film is provided in an individual fluid container 40 mounted upon that surface of paper 36 which is to be brought adjacent the exposed film surface. Said fluid may advantageously be of a viscous composition. A plurality of said fluid containers are thus mounted upon paper 36 to provide suitable supplies of fluid for processing the plurality of exposable areas of film mounted upon spool 28, one container being allocated for association with each exposed area of film. Paper 36 and film 26 are drawn between appropriate compressive means such, for example, as pressure rollers 42 and 44, respectively, container 40, when passing between said rollers, being positioned between said materials 36 and 26. When subjected to compression between the rollers, container 40 is collapsed, the fluid contents thereof being released and caused to flow between succeeding surfaces of said materials as they are progressively drawn between rollers 42 and 44. In subjecting the film and other material to progressively applied compression, for releasing and spreading the processing fluid therebetween, it will be apparent that the fluid container is necessarily positioned between the materials adjacent the leading edge of the exposed area of film. Thus, in Fig. 1, it will be seen that container 40 is to be superimposed with portion 26a of the film, said portion being shown as slightly in advance of the film area positioned for exposure. Means to insure said positioning of container 40 will presently be described.

Although it is not essential that compressive means 42 and 44 be employed for advancement of film 26 and paper 36, supplementary means such, for example, as sprockets or feed rollers engaging marginal portions of the materials being possible of incorporation for the purpose, said means 42 and 44 serve both for compression and propulsion of the materials in the embodiment shown in Fig. 1. The pressure rollers may accordingly be surfaced with suitable resilient material such as a yielding rubber-like composition. Shaft 46 of pressure roller 44 is rotatably mounted at either end upon a pair of arm members 48 (one arm only being shown), said arm being pivotally mounted upon bearing shaft 50 to enable movement of roller 44 toward or away from roller 42, said shaft 50 being rigidly attached to casing or other fixed portions of the camera.

Means for adjusting the force of compression exerted by roller 44 comprises knob 52, rigidly attached to adjusting screw 54, said screw being threaded through casing 56 and bearing upon spring member 58. Said spring 58, of a flat type, in turn, bears upon arm members 48 within slotted portions 48a thereof. When the camera casing is opened for threading film 26 and paper 36, as will presently be described, pivotal movement of arms 48 is limited by a pair of pins 49, one only of said pins being shown. Spring 60, bearing upon knurled portion 52a of knob 52, comprises means for releasably locking the aforesaid compression adjusting means. Knob 52 may preferably carry indicia 62 placed thereupon according to depressions in knurled portion 52a, said indicia being rotatable relative to spring 60, which serves as a fixed index, and enabling a plurality of settings of the compression adjusting means. Under certain conditions as, for example, variations in thickness of paper 36 or film 26, or changes in the characteristics of the materials as, for example, due to temperature changes, adjustment of compression exerted by roller 44 may be of importance relative to formation of the aforesaid photographic print.

Pressure roller 42 comprises shaft 64 rigidly attached thereto, said shaft being suitably mounted for rotation in bearings in the camera casing. As shown in the plan view of Fig. 2, a handcrank 66 is mounted upon the extremity of shaft 64, said shaft also bearing gear 68 rigidly fastened thereto, and gear 70, adapted to rotate freely relative thereto. A countershaft 72 is positioned adjacent and axially parallel to roller 42, said countershaft 72 being mounted for rotation in bearings in the camera casing or other fixed portions thereof. Countershaft 72 bears gears 74 and 76 and disc 78 rigidly fastened thereto, said disc 78 comprising a slot 80 formed in the periphery thereof. A lug or cam-like member 82, formed for insertion between contiguous marginal portions of the pressure rollers, for periodically separating said rollers, is rigidly mounted upon the aforesaid gear 70. Driving gear 68 engages gear 74 and provides rotation of countershaft 72 and gear 76. Gear 76, in turn, drives gear 70, which is mounted for independent rotation on shaft 64, and thereby rotates lug 82. Appropriate ratios of said gears will presently be described. Although not shown, it is to be understood that the mechanism comprising gears 68, 74, 76, and 70, and lug 82 is duplicated at opposite extremities of shaft 64 and countershaft 72. While pressure roller 44 is shown as deriving rotational force through frictional contact with materials advanced by powered roller 42, it will be understood that gearing shown may be modified to provide driving means for roller 44 also.

Figure 2:
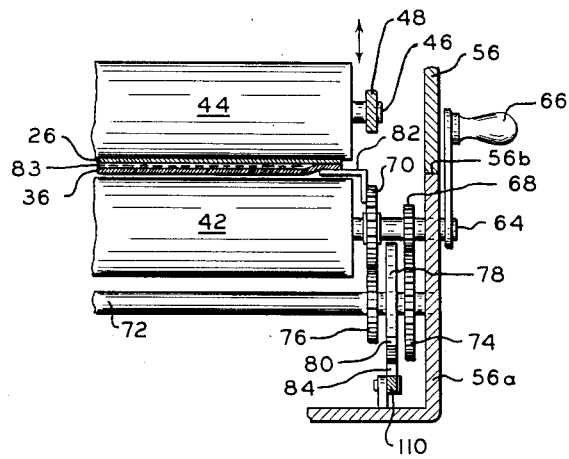
Fig. 2 is a fragmentary plan view of elements of Fig. 1.

In Fig. 2, film 26, paper 36, and a layer of processing fluid 83 spread therebetween are shown in cross-section, positioned between pressure rollers 42 and 44. Portions of said film and paper shown represent those immediately following the exposed image area of film, assuming rotation of handcrank 66 to be in a clockwise direction and movement of the materials to be away from the viewer. Areas of film and paper immediately succeeding said exposed image area provide surfaces adapted to receive and retain any portion of the processing fluid in excess of that required to process the exposed area of film and to form the positive print, namely, that quantity of fluid which may be caused to flow to said succeeding areas through compression of the image areas. To retain therewithin any of said excess of fluid which may be caused to flow beyond the image area to said fluid receiving areas, namely, to prevent further flow of the fluid beyond said last-named areas, it is desirable that no compression of said fluid receiving areas of the materials shall occur, even though the materials continue to undergo advancement. Lug 82, bearing upon substantially non-fluid bearing marginal portions of the materials, forces said portions and roller 44, contiguous therewith, away from roller 42, compression of fluid bearing portions of the materials accordingly being suspended, as shown. Assuming gear 70 and attached lug 82 to be driven in a clockwise direction, by clockwise rotation of the handcrank, and that the surfacing of lug 82 adjacent paper 36 is of knurled formation or is of a composition such as rubber, for frictional engagement with said paper 36, it will be seen that rotating lug 82, in conjunction with pressure roller 44, provides continued advancement of the materials despite the aforesaid relief of compression on fluid bearing portions thereof.

Figure 4:
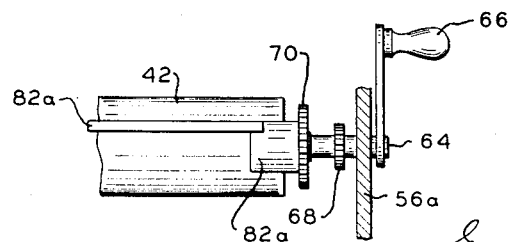
Fig. 4 is a fragmentary view of a modification of the pressure relieving element shown in Fig. 2.

Pressure rollers 42 and 44, when in direct contact with paper 36 and film 26, respectively, as shown in Fig. 1, are adapted to advance and compress lengths of said materials comprising the exposed image areas thereof and areas interconnecting said image areas including the portion of said interconnecting areas occupied by the fluid container but excluding the aforesaid small portion immediately following the image area affected by pressure relieving means 82. It is to be assumed that the overall length of an interconnecting area is according to the distance between the focal plane and the compression area between pressure rollers 42 and 44. Film 26 preferably comprises a continuous light-sensitive surface throughout its length whereby any portion thereof is adapted to positioning for exposure in the focal plane. During the aforesaid compression and advancement of materials by both rollers, the gearing mounted upon shaft 64 and countershaft 72 provides rotational movement of lug 82 from functional position adjacent one image area to functional position adjacent the next image area. Lug 82 operates to relieve compression of the aforesaid portions of the materials and to continue advancement of the materials until it is rotated out of contact therewith, whereupon the pressure rollers per se again assume their compressive and propulsive function. It will be seen that the width of lug 82 determines the width of a band of noncompressed portions of the materials adapted to receive the fluid, said band extending transversely of the materials between one of said lugs 82 and the other lug (not shown) adjacent the opposite extremity of pressure roller 42. Inasmuch as it is generally desirable to keep the diameters of pressure rollers as small as possible, it may be assumed that several revolutions of the pressure rollers are required to fulfill their joint propulsive function relative to a single image area of the materials and a single interconnecting portion thereof. Accordingly, it may be assumed that a single revolution of the compression relieving means accompanies said several revolutions of the pressure rollers and that gearing ratios of the apparatus are in accordance therewith. Supposing, for example, that the diameters of pressure rollers 42 and 44 are such that four revolutions of said rollers are required to advance and compress a length of the materials comprising the area occupied by the fluid container, the image area, and the major part of the interconnecting area, while one revolution of lug 82 is required to perform its aforementioned function relative to a portion of said interconnecting area. Accordingly, the ratio of gear 68 to gear 74 is 4 to 1, and the ratio of gear 76 to gear 70 is 1 to 1. In Fig. 4, a modified compression relieving element is shown comprising the aforesaid lug 82 and a bar 82a having functional portions of similar thickness to lug 82 and connecting said lug with that lug (not shown) adjacent the opposite extremity of pressure roller 42. Bar 82a provides compression of the materials along a sharply defined line comprising the trailing edge of the noncompressed area and thus provides an obstacle to further flow of the fluid beyond said area.

Again referring to Figs. 1 and 2 and to the above-described gearing ratios it will be seen that disc 78 turns through a single revolution simultaneously with one revolution of lug 82. Disc 78 and slot 80 thereof, in association with a positionable detent or dog 84, adapted to enter said slot 80, provide means for releasably locking the mechanism at a position whereat an area of film 26b is positioned for exposure across framing plate 20, an area of exposed film 26c has been subjected to compression with area of paper 36a during passage between pressure rollers 42 and 44 and a layer of processing fluid released from collapsed container 40a has been spread between said compressed materials. Likewise, at locked position of disc 78, lug 82 has completed its function of providing a noncompressed area of the materials and has moved out of contact therewith, advancement of the materials having been resumed by pressure rollers 42 and 44 to bring said noncompressed area 36b—26d, containing the aforesaid excess fluid adjacent severance means 86.

Figure 3:
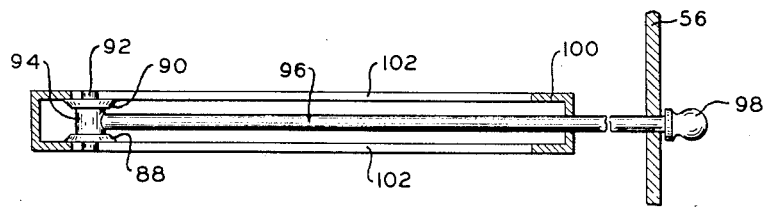
Fig. 3 is a side elevational view of an element shown in end elevation in Fig. 1 for cutting or excising a portion of the film and other materials.

Severance means 86, shown in Figs. 1 and 3, is preferably of a construction for excising area 36b—26d of the materials, thus performing the dual function of separating portions 36a—26c from succeeding lengths of the materials and of removing the noncompressed excess fluid containing portions of the materials which would otherwise be associated with said severed portions 36a—26c. Said severance means comprises a pair of circular cutting blades 88 and 90, rotatably mounted upon a shaft 92. Blades 88 and 90 are separated by a spacer block 94, said block preferably being rigidly fixed to shaft 92 and having attached thereto a rod 96 of suitable length for extending through the camera casing where it may be actuated exteriorly of said casing by a knob 98. Mounting means for the aforesaid components of the severance means comprises a channeled member 100 attached to fixed camera portions and extending transversely relative to the compressed materials, said member being provided with a pair of tracks 102 adapted to slidable movement of shaft 92 therewithin. A pair of fixed blades 104 and 106 are mounted to cooperate with the aforesaid rotatable blades. Normally, rod 96 is at its maximum inward position whereby rotatable blades 88 and 90 are slightly spaced from an edge of the compressed materials, and knob 98 is in contact with the camera casing. When knob 98 is manually pulled outwardly, said blades 88 and 90 are drawn across the materials and cooperate with fixed blades 104 and 106 to excise a section of the materials. Between an extension of said fixed blades 104 and 106, a compartment 108 is provided for receiving a plurality of excised portions of the materials, said portions being removable from said compartment when the camera casing is opened, as will presently be described.

The aforesaid detent or dog means 84 is normally biased to ride on the periphery of disc 78 and to enter slot 80 when said slot is adjacent therewith. Dog 84 has associated therewith means enabling its removal from slot 80 as, for example, a lever-like arm 110 comprising an extremity to which dog 84 is attached or with which it is unitary, and an opposite extremity to which an arm 112 is pivotally connected, said last-named arm extending through an aperture in the camera casing and having a button 114 attached to its extremity. Lever-like arm 110 is mounted for rotation upon a pivot 116 and is biased to provide said biasing of dog 84 toward disc 78 by a spring 118. Dog 84 is lifted from slot 80 through manual depression of button 114.

The camera casing, in conjunction with internal web or wall portions 120, 122, and 124 provide, respectively, a plurality of light-tight chambers 126, 128, and 30. Within chamber 126 are mounted compression means 42 and 44, excision means 86 and the aforesaid means associated therewith; chamber 128 provides a space for receiving lengths of the compressed materials; and chamber 30, comprising removable cover 32 and light-shielded aperture 134 provides means for loading a supply of film and maintaining said supply unexposed to actinic light. Web 120 comprises an aperture 136 for passage of the material from chamber 126 to chamber 128, said aperture having suitable light-shielding means 137 mounted adjacent thereto comprising, for example, strips of piled fabric. A pair of curved guide members 139 (one member only being shown) mounted upon cover 32 serve to define movement of compressed lengths of the materials within chamber 128 and to obviate obstruction thereof by said cover 32. Guide means 138 are also provided adjacent severance means 86 whereby, after severance of a length of the materials, the leading edge of a succeeding length of the materials may be positively advanced past the severance means and through aperture 136.

The camera casing comprises a portion 56a pivotally secured to fixed casing portion 56 by hinge 140 and releasably held in closed position by latch 142, said portion 56a comprising side portions 56b and being adapted to swing open for threading leaders of film 26 and paper 36 through elements of the apparatus. Within said pivotally movable casing portions are mounted fixed cutting blades 104 and 106, pressure roller 42 and means mounted upon shaft 64 thereof, countershaft 72 and associated means, and paper supply means 38. The aforesaid pivotally movable casing portion 56a also comprises a pivotally mounted subportion 56c, said last-named portion being mounted upon hinge 144 and releasably held in closed position by latch 146. Casing portion 56c is provided with a knob 148 whereby said portion may be swung open, providing access to the interior of chamber 128.

In threading the film and paper, handcrank 66 is rotated until dog 84 enters slot 80, casing portion 56a is swung to open position, a leader portion of film 26 is threaded across framing plate 20, around pressure roller 44, and into opened chamber 128. A leader of paper is threaded into opened chamber 128 in face-to-face relation to said film leader, it being essential that said paper leader be threaded to insure proper spacing of the fluid container mounted thereupon from the compressive means to insure its eventual positioning adjacent the leading edge of the exposed film. Means for accomplishing the aforesaid positioning of the container relative to the film comprises a portion of the apparatus against which the leading edge of the paper or a mark on the back of the paper may be aligned during the threading procedure as, for example, an edge of light-shielding means 137 mounted upon web 120. Assuming an appropriate length of the leader of paper material, the aforesaid alignment assures proper positioning of the first fluid container, at substantially the position of container 40 shown in Fig. 1. Casing portion 56a is then closed and succeeding containers will automatically be brought in contact with the aforesaid designated portions of the film adjacent each exposed frame during further advancement of the materials. When each length of the materials 36a—26c comprising an exposed, processed, and severed portion thereof has entered chamber 128, and after completion of a suitable period of time, door 56c may be opened, and said lengths of materials may be removed from the chamber and stripped apart for viewing the positive print. Provided paper 36 is opaque and film 26 comprises an opaque backing or base layer, the materials may be removed from chamber 128 immediately after entrance thereto or may be passed through an aperture (not shown) in the camera casing, thus obviating the requirement for chamber 128.

Various modifications of the apparatus are possible within the scope of the invention. Means shown for compressing the materials, for periodically relieving compression thereof, and for excising portions of the materials which have thus been relieved of compression may be employed with cut film and cut sheets of paper instead of the roll form shown, said cut materials being either supplied separately or in unitary form, as from suitable magazine means. As hereinbefore mentioned, separate compressive and propulsive means may be employed comprising interlocking mechanism whereby actuation of the propulsive means causes periodic separation of the compressive means. Gearing and detent means shown provide simple means for achieving periodic separation of the pressure rollers and for releasably locking the mechanism but other gearing assemblies and detent means may readily be employed for a similar purpose. Additional detent means or a modification of means shown may be incorporated in the apparatus for releasably locking disc 78 at another position whereby lug 82 is held adjacent roller 44 and serves to separate the rollers when the camera is not in use. In a further modification means similar to those shown could be employed for releasably locking the mechanism at a position whereby area 26a of the film is about to enter the bight of the compressive means, and additional associated means could be provided for introducing a fluid or a collapsible fluid container to said area, said fluid being supplied, for example, from a reservoir, or said fluid containers being introduced through a light-shielded slot in the camera casing, or from a magazine having suitable means for releasing individual fluid containers. Further modifications of severance and detent means would permit excision of the entire interconnecting area of the materials. Handcrank 66 could be supplanted by a suitable spring or electric motor. In the latter instance lever 110 could be formed for breaking the electrical circuit to said motor when dog 84 enters slot 80, and for closing said circuit when dog 84 is lifted from slot 80. The adaptability of the apparatus to commercial use as a camera of the automatic type in conjunction with which a booth is provided for the subject will be readily apparent, said apparatus being capable of providing an exposure and positive print of the subject image. Through the addition of simple interlocking mechanism triggering of the detent means could, for example, be provided by the insertion of a coin, and sequential actuation of both the shutter and detent release means be accomplished as by the subject, through connection of said release means with a remote control. It is further to be understood that casing portions may be modified to permit employment of the apparatus as an attachment for replacing the standard back of the camera. It will further be evident, in Fig. 1, that pin 49 could be repositioned toward the right or adjustably mounted relative to arm 48 whereby, when said pin and arm were brought in contact, pressure rollers 42 and 44 would be in spaced relationship. Knob 52 could then be tightened to the limit permitted and compressive means embodying a fixed spacing between their surfaces would be provided.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Camera apparatus for processing a photographically exposed portion of a film material comprising, in combination, means for supplying said film material, means for separately supplying another sheet-like material, pressure roller means for advancing said film to exposure position and for advancing both said materials to adjacent relation between said pressure rollers for compressing said materials and thereby providing flow of a processing fluid interposed between said materials adjacent the leading edge of said exposed portion of film, means for selectively adjusting said pressure roller means to vary the compressive properties thereof, means associated with said adjusting means for releasably holding said last-named means at any position of adjustment thereof, and a plurality of light-tight chambers comprising a plurality of interconnecting light-shielded apertures formed in the walls thereof for passage of film and other material therethrough, said chambers comprising, respectively, an enclosure for said film supply, an enclosure for said pressure rollers and associated means, and an enclosure for receiving said compressed materials.

2. Camera apparatus for processing a photographically exposed portion of a film material comprising, in combination, means for supplying said film material, means for separately supplying another sheet-like material, pressure roller means for advancing said film to exposure position and for advancing both said materials to adjacent relation between said pressure rollers for compressing said materials and thereby providing flow of a processing fluid interposed between said material adjacent the leading edge of said exposed portion of film, means for selectively adjusting said pressure roller means to vary the compressive properties thereof, means associated with said adjusting means for releasably holding said last-named means at any position of adjustment thereof, means associated with said pressure rollers for relieving compression of a predetermined portion of said materials to provide a noncompressed area adjacent the compressed area thereof, and a plurality of light-tight chambers comprising a plurality of interconnecting light-shielded apertures formed in the walls thereof for passage of film and other material therethrough, said chambers comprising, respectively, an enclosure for said film supply, an enclosure for said pressure rollers and associated means, and an enclosure for receiving said compressed materials, said last-named enclosure comprising access means thereinto.

3. Camera apparatus for processing a photographically exposed portion of a film material comprising, in combination, means for supplying said film material, means for separately supplying another sheet-like material, pressure roller means for advancing said film to exposure position and for advancing both said materials to adjacent relation between said pressure rollers for compressing said materials and thereby providing flow of a processing fluid interposed between said materials adjacent the leading edge of said exposed portion of film, means for selectively adjusting said pressure roller means to vary the compressive properties thereof, means associated with said adjusting means for releasably holding said last-named means at any position of adjustment thereof, means associated with said pressure rollers for relieving compression of a predetermined portion of said materials to provide a noncompressed area adjacent the compressed area thereof, means for excising said noncompressed area of the materials from other areas thereof, means interlocking with one of said rollers for releasably holding said noncompressed area of the materials adjacent said excising means, and a plurality of light-tight chambers comprising a plurality of interconnecting light-shielded apertures formed in the walls thereof for passage of film and other material therethrough, said chambers comprising, respectively, an enclosure for said film supply, an enclosure for said pressure rollers and associated means, and an enclosure for receiving said compressed materials, said last-named enclosure comprising access means thereinto.

4. Camera apparatus for processing a photographically exposed portion of a film material comprising, in combination, pressure roller means for advancing said film and another sheet-like material to adjacent relation and for further advancing and compressing said materials to provide flow therebetween of a processing fluid interposed between said materials adjacent the leading edge of said exposed portion of film, mounting means for said pressure roller means enabling movement of one of said rollers toward and away from the other, means for selectively adjusting said pressure roller means for varying the compressive properties thereof, means for actuating said pressure roller means, cam-like means actuated by said pressure roller actuating means, said cam-like means being coaxial with one of said pressure roller means and adapted to engage the other of said pressure roller means for periodically separating said pressure rollers and thereby relieving compression of a predetermined portion of said materials to provide a noncompressed area adjacent the compressed area thereof, said noncompressed area being adapted to receive and confine any portion of said fluid not retained between areas of the materials comprising said exposed film portion, means for excising said noncompressed area of materials from compressed areas thereof, said means comprising a pair of blades rotatably mounted upon shaft means, a spacer element for mounting said shaft means and for separating said rotatable blades, a fixedly mounted channeled member extending parallel to said film and other materials and comprising track means adapted to slidable movement of said shaft means therewithin, a pair of fixed blades cooperating with said rotatable blades, means for actuating said rotatable blades comprising a rod having one extremity attached to said spacer element and another extremity protruding exteriorly of the camera casing whereby said blades may be drawn across said materials, means for releasably holding said noncompressed area of materials adjacent said excising means for excision thereof, said last-named means comprising a disc having a slot formed in the periphery thereof, said disc being rotatably actuated by said pressure roller actuating means, and detent means comprising a lug portion normally biased for engagement with the periphery of said disc and adapted to enter said slot when adjacent therewith, said detent means comprising manually operable actuating means therefor positioned exteriorly of the camera casing for removing said lug portion from said slot to permit further advancement of the materials.

5. Camera apparatus for processing a photographically exposed portion of a film material comprising, in combination, pressure roller means for advancing said film and another sheet-like material to adjacent relation and for further advancing and compressing said materials to provide flow therebetween of a processing fluid interposed between said materials adjacent the leading edge of said exposed portion of film, pivotal mounting means for said pressure roller means enabling movement of one of said rollers toward and away from the other, shaft means for driving said pressure rollers, gear means mounted upon said shaft means comprising a driving gear fixed to said shaft and a gear freely rotatable relative to said shaft, said last-named gear bearing a cam-like member adapted to cause the aforesaid movement of one of said rollers away from the other, whereby a noncompressed area of the materials may be provided, countershaft means rotatably mounted adjacent said pressure rollers, means fixedly mounted upon said countershaft comprising a speed reduction gear driven by said driving gear and providing reduced rotational speed of said countershaft, a gear for driving said cam bearing gear at said reduced rotational speed, and a disc having a slot formed in the periphery thereof, detent means normally biased for engagement with the periphery of said disc and adapted to enter said slot when adjacent therewith for terminating rotation of the aforesaid rotatable means, said detent means having associated therewith manually operable actuating means for removing said detent from said slot, means for selectively adjusting said pressure roller means for varying the compressive properties thereof, means comprising a pair of rotatable blades mounted for movement across the compressed materials and cooperating with a pair of fixed blades for excising portions of said compressed materials, and means adjacent said fixed blades for releasably holding a plurality of excised portions of the materials.

6. Camera apparatus for processing a photographically exposed portion of a film material comprising, in combination, a pair of cooperating rollers for bearing simultaneously against opposite surfaces of said film and another sheet-like material while they are being advanced for compressing said materials to provide, in cooperation with the inner surfaces of said materials, spreading therebetween of a processing fluid which is interposed and releasably contained between said materials so as to lie adjacent the leading edge of said exposed portion of film, means for predeterminedly varying the compression of said rollers, rotatable means associated with said pressure rollers for automatically separating said rollers at predetermined stages of their rotation for relieving compression of a predetermined portion of said materials to provide a noncompressed area adjacent the compressed area thereof, means for excising said noncompressed area of the materials from adjacent areas, and means interlocking with the aforesaid rotatable means for positioning said noncompressed area of the materials adjacent said excising means so that said area may be excised.

7. Camera apparatus for photographically exposing and processing a photosensitive film material comprising, in combination, means for mounting a roll of said film material, means for positioning said film for photographic exposure and for exposing the same, means for separately mounting a roll of another sheet-like material comprising a surface adapted to formation of a positive photographic print thereupon and comprising a plurality of collapsible containers mounted in spaced relation upon said surface thereof, each of said containers being allocated for association with an exposed frame of film and releasably holding a predetermined quantity of film processing fluid, a pair of complementary pressure rollers mounted adjacent an extremity of said film positioning means for compressing said materials during movement of the latter and thereby providing, in cooperation with inner surfaces of the materials, release and flow of said processing fluid between said materials, means for initially positioning said sheet-like material whereby each fluid container thereof is caused to pass between said pressure rollers a predetermined distance in advance of an associated exposed frame of film, means for predeterminedly varying the compression of said pressure rollers, rotatable means associated with said pressure rollers for relieving compression of a predetermined portion of said materials to provide a non-compressed area adjacent the compressed area thereof, means associated with said rotatable means for automatically stopping movement of said materials, means comprising a pair of spaced blade-like members mounted side-by-side for excising that portion of said noncompressed area of the materials lying between said blade-like members from other areas thereof, and means adjacent said blade-like members providing a receptacle for receiving excised portions of said materials.

8. Photographic apparatus comprising, in combination, means providing an exposure position for a photosensitive film material, means comprising a pair of pressure-applying members with respect to which and between which said film material is moved after exposure in superposed relation with another sheet material, said pressure-applying members acting in conjunction with said materials to spread a liquid processing agent in a thin layer between the outer surfaces of said superposed sheet and film materials to predeterminedly process said film material, means for mounting one of said members for movement toward and away from said other member, means for resiliently biasing said movable member in the direction of said other member, and means for varying the bias applied by said biasing means to vary the thickness to which said processing agent is spread by the action of said pressure-applying members.

9. Photographic apparatus comprising, in combination, means for mounting a photosensitive film material, means including an exposure aperture for exposing said photosensitive film material, means comprising a pair of pressure-applying members with respect to which and between which said film material is moved after exposure in superposed relation with another sheet material, said pressure-applying members acting in conjunction with said materials to spread a liquid processing agent in a thin layer between the outer surfaces of said superposed sheet and film materials to predeterminedly process said film material, means comprising a pair of pivotal arms for mounting one of said members to provide for movement of said member toward and away from said other member, spring means engaging said arms for biasing said movable member in the direction of said other member, and means for varying the bias applied by said spring means to vary the thickness to which said processing agent is spread by the action of said pressure-applying members.

10. Photographic apparatus comprising, in combination, means for mounting a photosensitive film material, means including an exposure aperture for exposing said photosensitive film material, means comprising a pair of pressure-applying members with respect to which and between which said film material is moved after exposure in superposed relation with another sheet material, said pressure-applying members acting in conjunction with said materials to spread a liquid processing agent in a thin layer between the outer surfaces of said superposed sheet and film materials to predeterminedly process said film material, means comprising a pair of pivotal arms for mounting one of said members to provide for movement of said member toward and away from said other member, a spring engaging said arms and extending therebetween in a direction generally parallel to said movable member for biasing the latter in the direction of said other member, and means comprising an element engaging said spring at a position between said arms and a mechanism operable from the exterior of the apparatus for moving said element to control the bias exerted by said spring upon said movable member.

11. Photographic apparatus comprising, in combination, means for mounting a photosensitive film material, means including an exposure aperture for exposing said photosensitive film material, means comprising a pair of pressure-applying rollers with respect to which and between which said film material is moved after exposure in superposed relation with another sheet material, said pressure-applying rollers acting in conjunction with said materials to spread a liquid processing agent in a thin layer between the outer surfaces of said superposed sheet and film materials to predeterminedly process said film material, means comprising a pair of pivotal arms for mounting one of said rollers to provide for movement of said roller toward and away from said other roller, spring means engaging said arms for biasing said movable roller in the direction of said other roller, and means for varying the bias applied by said spring means to vary the thickness to which said processing agent is spread by the action of said pressure-applying rollers.

12. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure in superposed relation with another sheet material, said pressure-applying members acting in conjunction with said materials to spread a liquid processing agent in a thin layer throughout the exposed area of said film material to process said area, means for mounting one of said pressure-applying members for movement toward and away from said other member, and separating means for effecting separation of said liquid-spreading members without stopping the movement of said superposed materials relative to said members, separation of said members so increasing the thickness of the liquid layer as to concentrate any excess of liquid in that portion of the superposed material passing through said separating members.

13. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure in superposed relation with another sheet material, said pressure-applying members acting in conjunction with said materials to spread a liquid processing agent in a thin layer throughout the exposed area of said film material to process said area, means for mounting one of said pressure-applying members for movement toward and away from said other member, separating means for effecting separation of said liquid-spreading members without stopping the movement of said superposed materials relative to said members, and means for controlling the operation of said separating means so as to automatically separate said spreading members after the exposed area has advanced therethrough, separation of said members so increasing the thickness of the liquid layer as to concentrate any excess of liquid in that portion of the superposed film and sheet materials immediately following the exposed area.

14. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure in superposed relation with another sheet material, said pressure-applying members acting in conjunction with said materials to spread a liquid processing agent in a thin layer throughout the exposed area of said film material to process said area, means for mounting one of said pressure-applying members for movement toward and away from said other member, separating means for effecting separation of said liquid-spreading members without stopping the movement of said superposed materials relative to said members, said separating means comprising elements for moving between said members in engagement with portions of said sheet materials, said elements urging said movable member through said materials away from said other member, and means for controlling the operation of said elements so as to automatically separate said spreading members after the exposed area has advanced therethrough, separation of said members so increasing the thickness of the liquid layer as to concentrate any excess of liquid in that portion of the superposed film and sheet materials immediately following the exposed area.

15. Photographic apparatus comprising, in combination, means for mounting a photosensitive film material, means including an exposure aperture for exposing said photosensitive film material, liquid-spreading means comprising a pair of pressure-applying rollers with respect to which and between which said film material is moved after exposure in superposed relation with another sheet material, said pressure-applying rollers acting in conjunction with said matterials to spread a liquid processing agent in a thin layer throughout the exposed area of said film material to process said area, means for mounting one of said pressure-applying rollers for movement toward and away from said other roller, separating means for effecting separation of said liquid-spreading rollers without stopping the movement of said superposed materials relative to said rollers, said separating means comprising at least one element for moving said movable roller, and means for controlling the operation of said element, said last-named means automatically moving said element into operative position after a predetermined length of said superposed materials has advanced between said rollers.

16. Photographic apparatus comprising, in combination, means for mounting a photosensitive film material, means including an exposure aperture for exposing said photosensitive film material, liquid-spreading means comprising a pair of pressure-applying rollers with respect to which and between which said film material is moved after exposure in superposed relation with another sheet material, said pressure-applying rollers acting in conjunction with said materials to spread a liquid processing agent in a thin layer throughout the exposed area of said film material to process said area, means for mounting one of said pressure-applying rollers for movement toward and away from said other roller, separating means for effecting separation of said pressure-applying rollers without stopping the movement of said superposed materials relative to said rollers, said separating means comprising at least one element for moving said movable roller, and means connected to one of said rollers for automatically rendering said element operative after a predetermined angular rotation of said last-named roller.

17. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure in superposed relation with another sheet material, said pressure-applying members acting in conjunction with said materials to spread a liquid processing agent in a thin layer throughout the exposed area of said film material to process said area, and severing means comprising a pair of cutting elements for severing a strip of said superposed materials by cutting the same transversely along two lines spaced lengthwise of said materials, said severing means being located adjacent said pressure-applying members.

18. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure is superposed relation with another sheet material, said pressure-applying members acting in conjunction with said materials to spread a liquid processing agent in a thin layer throughout the exposed area of said film material to process said area, means for mounting one of said pressure-applying members for movement toward and away from said other member, separating means for effecting separation of said pressure-applying members without stopping the movement of said superposed materials relative to said members, severing means for severing a strip of said superposed materials by cutting the same transversely along two lines spaced lengthwise of said superposed materials, and mechanism connected to said spreading members for stopping said superposed materials when the exposed area of said film material is advanced just beyond said severing means.

19. Photographic apparatus comprising, in combination, means for mounting a photosensitive film material, means including an exposure aperture for exposing said photosensitive film material, liquid-spreading means comprising a pair of pressure-applying members with respect to which and between which said film material is moved after exposure in superposed relation with another sheet material, said pressure-applying members acting in conjunction with said materials to spread a liquid processing agent in a thin layer throughout the exposed area of said film material to process said area, means for mounting one of said pressure-applying members for movement toward and away from said other member, separating means for effecting separation of said pressure-applying members without stopping the movement of said superposed materials relative to said members, severing means for severing a strip of said superposed materials by cutting the same transversely along two lines spaced lengthwise of said superposed materials, means adjacent said severing means providing a receptacle for receiving the several strips of said superposed materials, and mechanism connected to said spreading members for stopping said superposed materials when the exposed area of said film material is advanced just beyond said severing means.

EDWIN H. LAND.
JOSEPH F. CARBONE.
JOHN A. CARRIER.

REFERENCES CITED

The following references are of record in the file of this patent:

UNITED STATES PATENTS

| Number | Name | Date |
| --- | --- | --- |
| 139,132 | Entrekin | May 20, 1873 |
| 527,315 | Boles | Oct. 9, 1894 |
| 2,355,779 | Burleigh | Aug. 15, 1944 |
| 2,435,720 | Land | Feb. 10, 1948 |
| 2,455,126 | Land | Nov. 30, 1948 |

FOREIGN PATENTS

| Number | Country | Date |
| --- | --- | --- |
| 470,197 | Great Britain | Aug. 11, 1937 |
| 879,995 | France | Dec. 10, 1942 |